US009703653B2

United States Patent
Endo

(10) Patent No.: US 9,703,653 B2
(45) Date of Patent: Jul. 11, 2017

(54) CLOUD SYSTEM MANAGEMENT APPARATUS, CLOUD SYSTEM, REALLOCATION METHOD, AND COMPUTER PROGRAM PRODUCT

(71) Applicants: KABUSHIKI KAISHA TOSHIBA, Minato-ku, Tokyo (JP); TOSHIBA SOLUTIONS CORPORATION, Kawasaki-shi, Kanagawa (JP)

(72) Inventor: Kotaro Endo, Fuchu Tokyo (JP)

(73) Assignees: KABUSHIKI KAISHA TOSHIBA, Tokyo (JP); TOSHIBA SOLUTIONS CORPORATION, Kawasaki-shi (JP)

( * ) Notice: Subject to any disclaimer, the term of this patent is extended or adjusted under 35 U.S.C. 154(b) by 196 days.

(21) Appl. No.: 14/725,191

(22) Filed: May 29, 2015

(65) Prior Publication Data

US 2015/0261630 A1 Sep. 17, 2015

Related U.S. Application Data

(63) Continuation of application No. PCT/JP2012/082215, filed on Dec. 12, 2012.

(51) Int. Cl.
*G06F 11/00* (2006.01)
*G06F 11/20* (2006.01)
(Continued)

(52) U.S. Cl.
CPC ........ *G06F 11/203* (2013.01); *G06F 11/2025* (2013.01); *G06F 11/2028* (2013.01);
(Continued)

(58) Field of Classification Search
CPC ............. G06F 11/2025; G06F 11/2028; G06F 11/203; G06F 11/2035; G06F 11/3433;
(Continued)

(56) References Cited

U.S. PATENT DOCUMENTS

2002/0059427 A1  5/2002  Tamaki et al.
2003/0028642 A1  2/2003  Agarwal et al.
(Continued)

FOREIGN PATENT DOCUMENTS

CN  101056237  10/2007
CN  101188509   5/2008
(Continued)

OTHER PUBLICATIONS

Japanese Office Action for Japanese Patent Application No. 2014-551787 mailed on Sep. 20, 2016.
(Continued)

*Primary Examiner* — Joshua P Lottich
(74) *Attorney, Agent, or Firm* — Amin, Turocy & Watson LLP

(57) ABSTRACT

According to an embodiment, a cloud system management apparatus includes an estimator, a detector, a determination processor, and a reallocator. The estimator is configured to estimate breach information based on quality information representing a quality level to be achieved by a service process operating in any one of server devices in a cloud system. The breach information represents a degree by which the service process is incapable of achieving the quality level. The detector is configured to detect a failure of each server device. The determination processor is configured to determine, to reallocate at least one first service process operating on a first server device whose failure is detected, a second server device having a smaller sum of the breach information on at least one second service process operating on the second server device. The reallocator is configured to reallocate the first service process to the second server device.

9 Claims, 9 Drawing Sheets

(51) Int. Cl.
*H04L 29/08* (2006.01)
*H04L 12/24* (2006.01)
*G06F 11/34* (2006.01)

(52) U.S. Cl.
CPC ...... *G06F 11/2035* (2013.01); *H04L 41/5019* (2013.01); *H04L 67/10* (2013.01); *H04L 67/1034* (2013.01); *G06F 11/3433* (2013.01)

(58) Field of Classification Search
CPC .. H04L 41/5019; H04L 67/10; H04L 67/1034
See application file for complete search history.

(56) References Cited

U.S. PATENT DOCUMENTS

| | | | |
|---|---|---|---|
| 2003/0135510 A1* | 7/2003 | Papini | H04L 12/26 |
| 2007/0250907 A1 | 10/2007 | Endo | |
| 2010/0146037 A1* | 6/2010 | Little | G06F 17/30306 709/203 |
| 2010/0238802 A1* | 9/2010 | Lei | H04L 41/5006 370/230.1 |
| 2010/0306776 A1* | 12/2010 | Greene | G06Q 10/10 718/101 |
| 2013/0166750 A1* | 6/2013 | Moon | H04L 67/322 709/226 |
| 2014/0098677 A1* | 4/2014 | Otung | H04L 41/145 370/242 |
| 2014/0173336 A1* | 6/2014 | Bennah | G06F 11/2028 714/4.12 |

FOREIGN PATENT DOCUMENTS

| | | |
|---|---|---|
| JP | 2001-325117 | 11/2001 |
| JP | 2002-024192 | 1/2002 |
| JP | 2004-259092 | 9/2004 |
| JP | 2004-538573 | 12/2004 |
| JP | 2005-011237 | 1/2005 |
| JP | 2005-100387 | 4/2005 |
| JP | 2007-249470 | 9/2007 |
| JP | 2011-039740 | 2/2011 |
| JP | 2012-108651 | 6/2012 |

OTHER PUBLICATIONS

International Search Report for International Patent Application No. PCT/JP2012/082215 Dated Mar. 5, 2013, 5 pages.
Written Opinion for International Patent Application No. PCT/JP2012/082215 dated Mar. 5, 2013, 5 pages.
Japanese Office Action for Japanese Patent Application No. 2014-551787 mailed on Jun. 14, 2016.

* cited by examiner

| SERVICE PROCESS NAME | QUALITY INFORMATION | CUMULATIVE DOWNTIME | BREACH INFORMATION |
|---|---|---|---|
| A | 52 MINUTES/YEAR | 0 MINUTES | 0 YEN |
| B | 30 MINUTES/YEAR | 29 MINUTES | 0 YEN |
| ⋮ | ⋮ | ⋮ | ⋮ |
| N | 40 MINUTES/YEAR | 42 MINUTES | XXX YEN |

| SERVICE PROCESS NAME | BREACH PREDICTION INFORMATION |
|---|---|
| A | 0 YEN |
| B | YYY YEN |
| ⋮ | ⋮ |
| N | ZZZ YEN |

CLOUD SYSTEM MANAGEMENT APPARATUS, CLOUD SYSTEM, REALLOCATION METHOD, AND COMPUTER PROGRAM PRODUCT

CROSS-REFERENCE TO RELATED APPLICATION

This application is a continuation of International Application No. PCT/JP2012/082215, filed on Dec. 12, 2012, the entire contents of which are incorporated herein by reference.

FIELD

Embodiments described herein relate generally to a cloud system management apparatus, a cloud system, a reallocation method, and a computer program product.

BACKGROUND

The number of enterprises using services provided by cloud systems (hereinafter, referred to as "cloud services") in their business activities has been increased. One of the advantages of using a cloud service is a reduction in the system total cost of ownership (TCO). In particular, a reduction in the operation and administration costs is worth an attention. Another appealing point is in the system installation and updating costs that are much lower than those for in-house developed systems.

One of the fundamental reasons why use of a cloud service reduces a TCO is that the computer resources such as server devices are effectively utilized. Service providers providing a large number of cloud services can increase the total utilization of the computer resources by efficiently allocating the resources to the services.

Thus, the service providers can provide cloud services at a low cost, compared with that required in the systems owned by individual users. Because conventional systems are typically designed to allocate computer resources statically to the services, such systems have been incapable of allocating a large number of computers to a large number of service processes freely.

From a technological standpoint, developments in the virtualization technology have made a large contribution to the wide-spreading use of cloud services. Virtualization technologies partition a physical computer resource into logical units (virtual machines), and assign such logical units to service processes, so that computer resources can be freely assigned to services. As a result, physical computer resources can be shared among services regardless of the type of the services, and potential for the optimal allocation of physical computer resources has been increased.

Because a cloud system includes a large number of computers, a mandatory requirement of the systems is the fail-safeness of the computers. Generally speaking, the failure probability in a cloud system increases as the number of computers increases. Assuming that the availability of a single computer is 99.95 percent, as an example, the availability at which ten-thousand computers all operate normally simultaneously is less than one percent.

As the cloud services come to be used in an increased number of fields, users have started considering using the cloud services for services requiring 24×7 stable operations, e.g., what is called social infrastructure services. At the same time, there are some other cloud services such as big data analyses that require an enormous amount of computing resources, but do not always require high reliability or availability.

For example, some services may require a guarantee for 24×7 non-stop operations with a mean time to repair (MTTR) of 1 minute or less, and some other services may only require best-effort availability at an availability factor of 99 percent or so. Another example of a service in which the availability is less critical is a service allowing computer resources to be used at a low price while the computer resources are not used. Related art examples are disclosed in Japanese Patent Application Laid-open No. 2005-011237, and Japanese Patent Application Laid-open No. 2005-100387.

In case of a server failure in the cloud system, however, it has been difficult to efficiently allocate services to available server devices in consideration of the quality levels the service processes are required to achieve.

DETAILED DESCRIPTION

According to an embodiment, a cloud system management apparatus includes an estimator, a detector, a determination processor, and a reallocator. The estimator is configured to estimate breach information based on quality information representing a quality level to be achieved by a service process operating in any one of server devices in a cloud system. The breach information represents a degree by which the service process is incapable of achieving the quality level. The detector is configured to detect a failure of each server device. The determination processor is configured to determine, to reallocate at least one first service process operating on a first server device whose failure is detected, a second server device having a smaller sum of the breach information on at least one second service process operating on the second server device. The reallocator is configured to reallocate the first service process to the second server device.

The availability and performance requirements of a cloud service are generally defined in a service level agreement (SLA). An SLA is a commitment of a service provider providing a service to provide the service at a certain level of quality to the customer. An SLA ensures that the service is provided at a certain level of availability and performance such as average response time. The level of performance, as well as that of availability, to be ensured differs depending on the type of the cloud service.

SLAs are broadly classified into two types based on the quality levels to be ensured: guaranteed SLAs and best-effort SLAs. With a guaranteed SLA, the customer is guaranteed for the satisfaction of the quality requirement. With a best-effort SLA, the provider will make the best efforts to improve the quality. Generally speaking, a service requiring a guarantee for a performance often requires a guarantee for availability as well.

The total utilization of the computer resources tends to remain low when services are provided under guaranteed SLAs, because the providers need to assign extra computer resources assuming the worst possible scenarios. By contrast, when services are under best-effort SLAs, the total utilization of computer resources can be improved by over-committing computer resources to the services, that is, by assigning computer resources in excess of the physical computer resources to the services.

Figure 1:
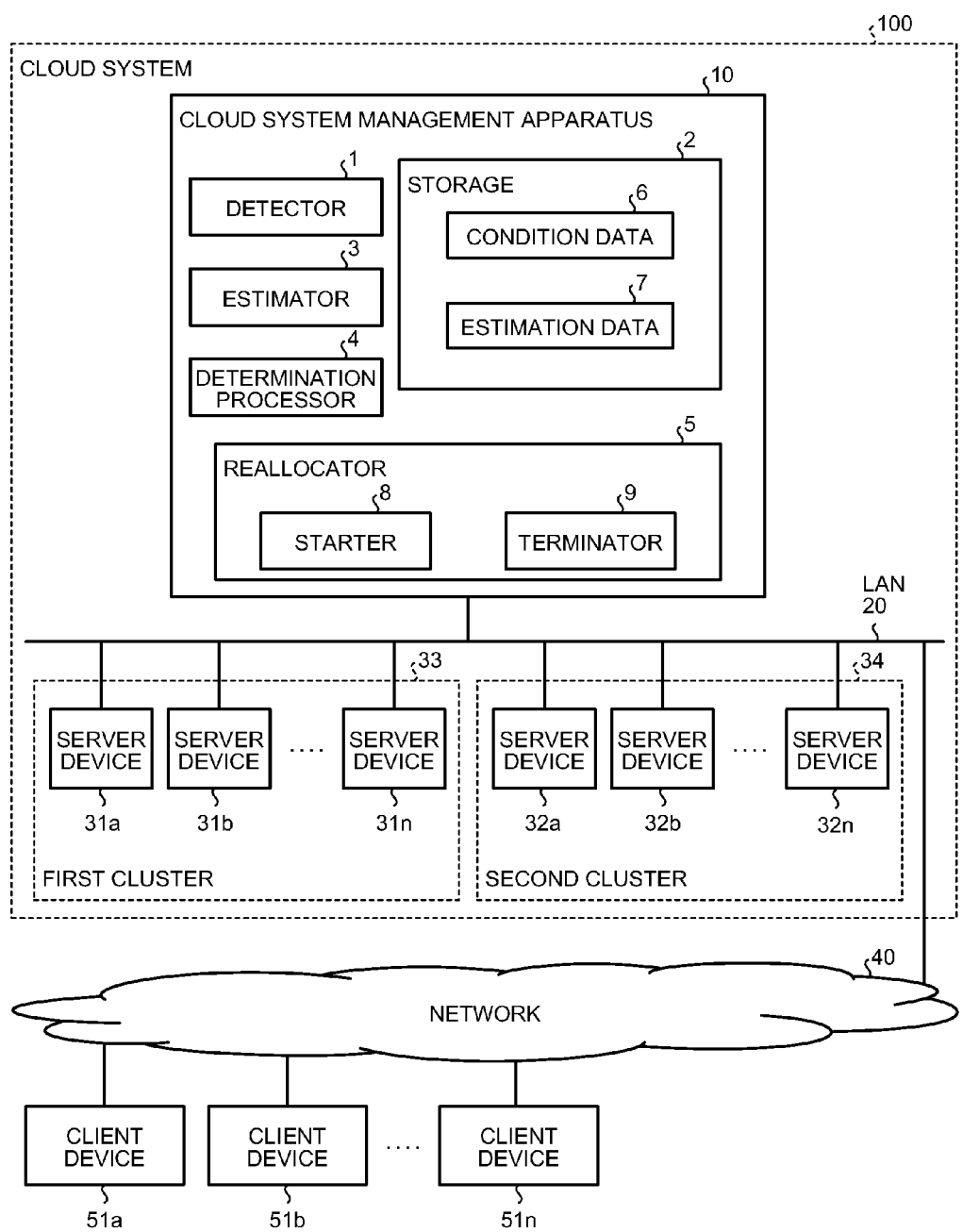
FIG. 1 is a schematic illustrating an exemplary configuration of a cloud system according to an embodiment.

A cloud system management apparatus, a cloud system, and a computer program according to one embodiment will now be explained. FIG. 1 is a schematic illustrating an exemplary configuration of a cloud system 100 according to the embodiment. The cloud system 100 according to the embodiment includes a cloud system management apparatus 10, server devices 31a to 31n, and server devices 32a to 32n. The server devices 31a to 31n are used in a first cluster 33 at the point in time when the operation of the cloud system 100 is started. The server devices 32a to 32n are used in a second cluster 34 at the point in time when the operation of the cloud system 100 is started. The first cluster 33 and the second cluster 34 will be described later in detail.

Hereinafter, the server devices 31a to 31n are generally referred to as server devices 31 when it is not necessary to distinguish the server devices 31a to 31n from one another, and the server devices 32a to 32n are generally referred to as server devices 32 when it is not necessary to distinguish the server devices 32a to 32n from one another. The numbers of the server devices 31 and the server devices 32 may be any number. The cloud system 100 may be a system for allowing a cloud service provider to provide a cloud service for a profit, or may be a private cloud system.

The cloud system management apparatus 10, the server devices 31a to 31n, and the server devices 32a to 32n are connected to one another over a local area network (LAN) 20. The cloud system management apparatus 10, the server devices 31a to 31n, and the server devices 32a to 32n are connected to client devices 51a to 51n over the LAN 20 and a network 40. The client devices 51a to 51n are generally referred to as client devices 51 when it is not necessary to distinguish the client devices 51a to 51n from one another.

The client devices 51 are devices used by users who receive a service from the cloud system 100. The client devices 51 may be any device. The client device 51 may be, for example, a personal computer (PC) or a mobile terminal.

The network 40 is the Internet, for example. In a configuration in which the cloud system management apparatus 10, the server devices 31a to 31n, and the server devices 32a to 32n are partly deployed in another location, the LAN 20 may be substituted with the Internet or a virtual private network (VPN).

The cloud system management apparatus 10 includes a detector 1, a storage 2, an estimator 3, a determination processor 4, and a reallocator 5. The detector 1 detects a failure in the server devices 31a to 31n and the server devices 32a to 32n.

Figures 2, 3, 4:
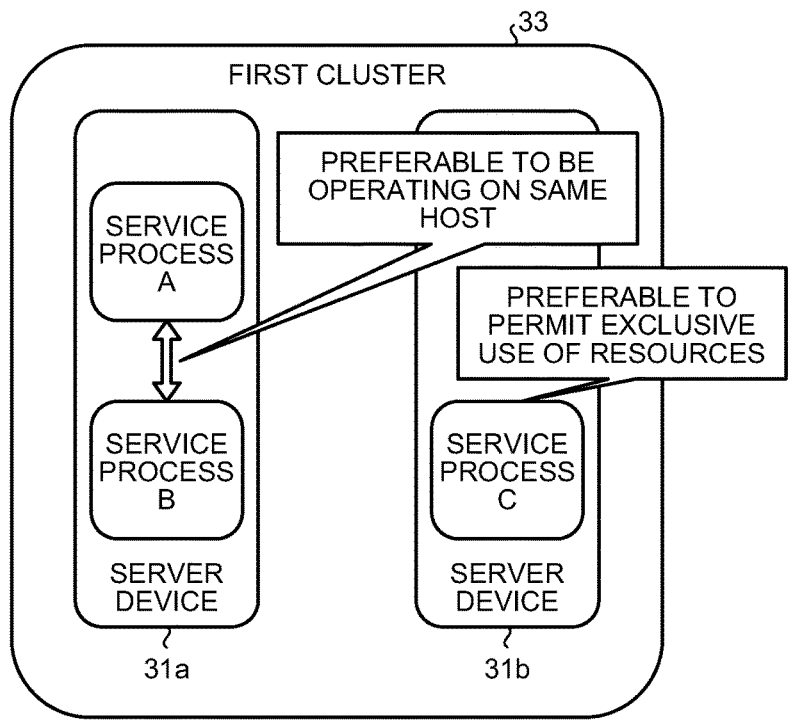
FIG. 2 is a schematic illustrating exemplary estimation data in the cloud system management apparatus according to the embodiment.
FIG. 3 is a schematic illustrating exemplary estimation data in the cloud system management apparatus according to the embodiment.
FIG. 4 is a schematic for explaining an example of a first cluster in the cloud system according to the embodiment.

The storage 2 stores therein condition data 6 and estimation data 7. FIG. 2 is a schematic illustrating exemplary data representing the degrees by which quality targets are achieved in the cloud system management apparatus 10 according to the embodiment. The condition data 6 includes service process name, quality information, cumulative downtime, and breach information. The service process name specifies the name of a service process operating on a server device 31 (32). The quality information specifies the quality level to be achieved by the service process. The quality information is defined by an SLA, for example. Examples of the quality level include, but not limited to, availability and performance levels guaranteed by the service process. An example of a performance level includes, but not limited to, an average response time of the service process. The cumulative downtime is the sum of the time while which the service process has been inoperative. The breach information is a piece of information representing a degree by which the system is incapable of achieving the service level specified in the quality information. In the example illustrated in FIG. 2, the breach information specifies a penalty. This penalty is accrued as a charge per unit time multiplied by a downtime in excess of the downtime rendered as acceptable in the quality information (hereinafter, referred to as "breach time"), for example.

Specific examples illustrated in FIG. 2 will now be explained. The quality information of a service process A specifies that the acceptable cumulative downtime for the service process A is 52 minutes or less per year. In other words, the estimator 3 generates the breach information when the cumulative downtime exceeds 52 minutes. The current cumulative downtime for the service process A is 0 minutes, and therefore, the estimator 3 has not generated the breach information yet.

The quality information of a service process B specifies that the acceptable cumulative downtime for the service process B is 30 minutes or less per year. In other words, the estimator 3 generates the breach information when the cumulative downtime exceeds 30 minutes. The current cumulative downtime for the service process B is 29 minutes, and therefore, the estimator 3 has not generated the breach information yet, but only 1 minute remains for the service process B to be inoperative before the penalty is accrued.

The quality information of the service process N specifies that the acceptable cumulative downtime for the service process N is 40 minutes or less per year. In other words, the estimator 3 generates the breach information when the cumulative downtime exceeds 40 minutes. The current cumulative downtime for the service process N is 42 minutes, and therefore, the estimator 3 has generated breach information (penalty) of XXX yen which is the product of a charge per unit breach time multiplied by the breach time (2 minutes).

In the manner described above, the cloud system management apparatus 10 quantifies how far the quality information (e.g., the SLA) has been achieved, as the condition data 6. Achievement of the quality information is quantified for each of the service processes. The achievement of each of the service processes is recorded in the storage 2, as needed, for each of the service processes.

The way in which the breach information is generated is not limited to that described above. Furthermore, the quality information illustrated in FIG. 2 only specifies service levels related to the availability of the service processes, but the quality information is not limited to the availability of the service processes. The quality information may be information related to the performance of the service processes, e.g., a processing time (average response time) calculated from the available ratio of the server device resources.

FIG. 3 is a schematic illustrating an example of the estimation data 7 in the cloud system management apparatus 10 according to the embodiment. The estimation data 7 includes a service process name and breach prediction information. The service process name specifies the name of a service process. The breach prediction information is estimated by calculating the sum of a prediction of a downtime to be accrued in a reallocation of the service process and the cumulative downtime of the service process. This breach prediction information may be used as one of the indices for determining whether the service process should be terminated. The way for calculating the breach prediction information can be established in any way, in a manner suitable for the quality information of the service process.

Referring back to FIG. 1, the estimator 3 estimates the breach information representing a degree by which the service process will be incapable of achieving the quality level based on the quality information representing the quality level to be achieved by the service process. The determination processor 4 selects a target server device to which a service process is to be reallocated when reallocation of the service process is needed due to reasons such as a failure of a server device 31, on the basis that the smallest breach information is accrued for at least one service process operating on the target server device.

The reallocator 5 includes a starter 8 and a terminator 9. The reallocator 5 reallocates a service process by causing the terminator 9 to terminate the service process, and causing the starter 8 to start the service process. An example in which a service process A is reallocated from the server device 31a to the server device 32a will now be explained. To begin with, the terminator 9 terminates the service process A on the server device 31a. The starter 8 then starts the service process A on the server device 32a. In this manner, the reallocator 5 moves (reallocates) the service process A from the server device 31a to the server device 32a. At this time, the time elapsed from when the service process is terminated to when the service process is started is added to the cumulative downtime, and the cumulative downtime is recorded in the storage 2. When a service process is reallocated due to a failure of the server device 31a, the terminator 9 does not actually terminate the service process A, but the time required for the failure of the server device 31a to be detected (e.g., heartbeat timeout time) is added to the cumulative downtime.

FIG. 4 is a schematic for explaining an example of the first cluster 33 in the cloud system 100 according to the embodiment. Service processes with the performance, availability, and the like to be guaranteed by the quality information (hereinafter, referred to as "first service process") operate in the first cluster 33.

The first cluster 33 is a logical group of a plurality of server devices 31 included in the cloud system 100. At least one service process operating on a server device 31 is statically allocated by the cloud system management apparatus 10. In other words, at least one service process operating on the server device 31 operates in hardware and software configurations that are system-designed so that the quality information such as a predetermined performance requirement is always guaranteed.

When a server device 31 included in the first cluster 33 terminates due to a failure, the server device 31 is hot-swapped. In the hot-swapping in the embodiment, the resources of a server device 32 in the second cluster 34 are released so as to make the server device 32 unused, and the unused server device 32 is swapped with the failure server device 31 in the first cluster 33.

The determination processor 4 determines a target server device 32 to be hot-swapped with the failed server device. The determination processor 4 determines a target server device 32 to be hot-swapped in the second cluster 34 in such a manner that the following two conditions are satisfied. The first condition is that the server device 32 has computer resources capable of exhibiting sufficient performance even after the server device 32 is swapped with the failed server device 31. The second condition is that the smallest breach information is accrued to a service process operating on the server device 32, as a result of terminating the server device 32.

This hot-swapping appears as if the failed server device 31 has been recovered and the server device 32 in the second cluster 34 has failed. In other words, the service process in the first cluster 33 is restarted in the same configuration as in the original configuration, and the service process operating on the server device 32 in the second cluster 34 is reallocated to another server device, in the same manner as when the server device 32 has terminated due to a failure.

In the example illustrated in FIG. 4, the service process A and the service process B are operating on the server device 31a. The service process A and the service process B are operated on the same host to ensure a high-speed communication between the service process A and the service process B. In this manner, the cloud system 100 ensures the performance of the service process A and the service process B. A service process C is operating alone on the server device 31b. The service process C can therefore gain exclusive use of the resources, such as the central processing unit (CPU), the memory, and the communication interface (I/F), of the server device 31b. In this manner, the cloud system 100 ensures the performance of the service process C.

Figure 5:
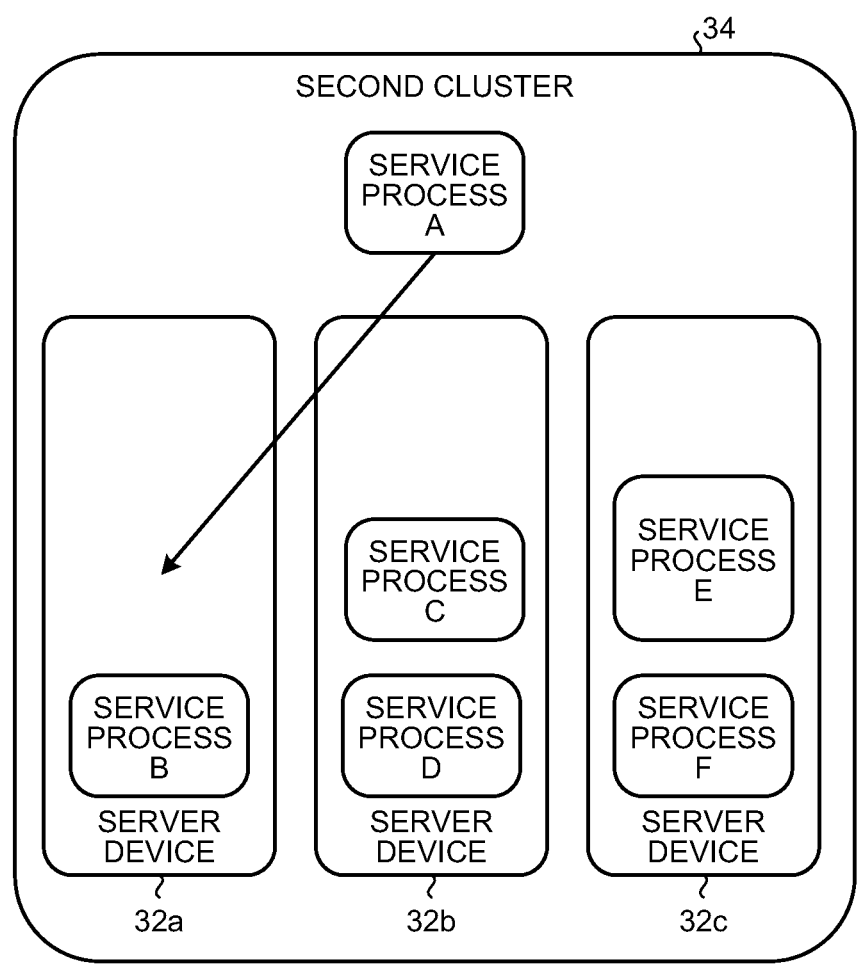
FIG. 5 is a schematic for explaining an example of a second cluster in the cloud system according to the embodiment.

FIG. 5 is a schematic for explaining an example of the second cluster 34 in the cloud system 100 according to the embodiment. Service processes with the performance, availability, and the like not to be guaranteed by the quality information (hereinafter, referred to as a "second service process") operate in the second cluster 34. The second service process is operated in an environment where the second service process can exhibit the highest performance, availability, and the like as much as possible. To achieve this goal, the computer resources of the server device 32 belonging to the second cluster 34 may be over-committed actively so as to improve the utilization of the computer resources. In other words, a service process operating on the server device 32 may be allocated to logical resources in excess of the physical resources.

The second cluster 34 is a logical group of a plurality of such server devices 32 included in the cloud system 100. The cloud system management apparatus 10 dynamically allocates at least one service process to operate on each of the server devices 32. The cloud system management apparatus 10 allocates a service process dynamically using a particular algorithm. The algorithm is determined by the resources, the load, and the extra resources of the server device 32 to be consumed by the service process, and quality information of the service process (e.g., the SLA), the cost (e.g., price) of the service provided by the service process, and information related to the allocation of the service process. When the server device 32 belonging to the second cluster fails, the cloud system management apparatus 10 reallocates one or more service processes having been operating on the server device 32 to another server device 32 in the second cluster 34.

For example, it is now assumed that a service process A is a second service process, and that the server device 32 on which the service process A has been operating fails. On the server device 32a, a service process B is operating. On the server device 32b, a service process C and a service process D are operating. On the server device 32c, a service process E and a service process F are operating. At this time, the reallocator 5 reallocated the service process A to another server device so that the impact of the reallocation on the performance, the availability, and the like of the other service processes is minimized. The reallocator 5 also reallocates the service process A so that the performance, the availability, and the like of the service process A are maximized. In the example illustrated in FIG. 5, the server device 32a running only the service process B is selected as a target server device to which the service process A is to be reallocated. In other words, the determination processor 4 in this example determines a target server device to which the service process A is to be reallocated in such a manner the second service processes are equally allocated among the server devices 32. In the example illustrated in FIG. 5, the service processes are denoted as service processes A to F, but these service processes A to C are unrelated to the service processes A to C in FIG. 4. The same applies to the examples illustrated in FIGS. 6 and 8 to 11.

Figure 6:
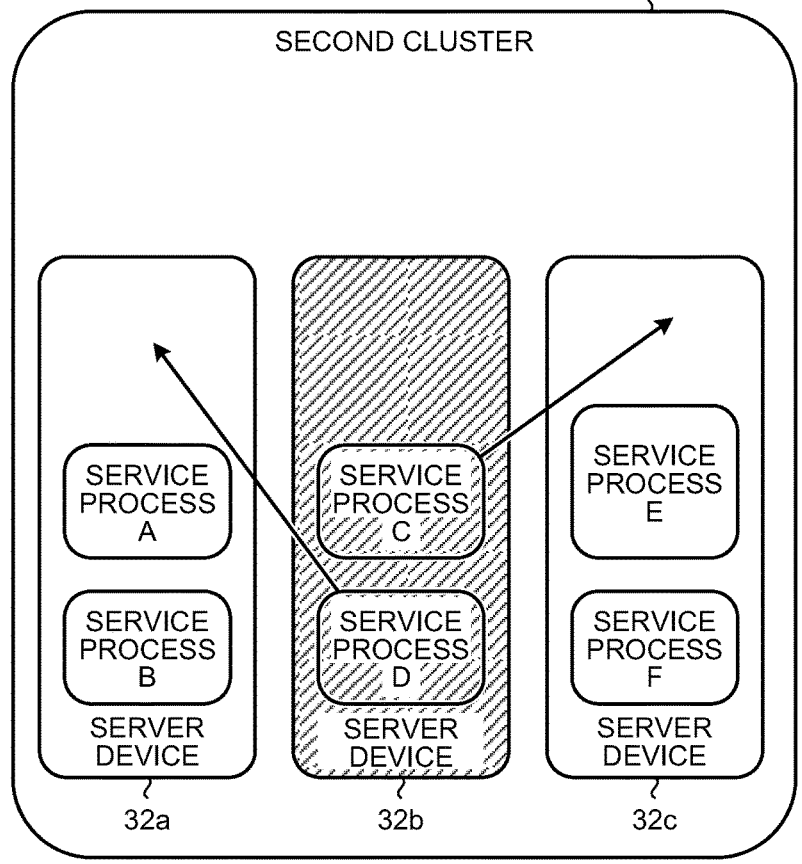
FIG. 6 is a schematic for explaining an exemplary method for reallocating a service process belonging to the second cluster in the cloud system according to the embodiment.

FIG. 6 is a schematic for explaining an example of a method for reallocating a service process belonging to the second cluster in the cloud system 100 according to the embodiment. In the example illustrated in FIG. 6, a service process A and a service process B are operating on the server device 32a, and the server device 32b on which a service process C and a service process D are operating is represented as failed. On the server device 32c, a service process E and a service process F are operating.

In the example illustrated in FIG. 6, the reallocator 5 reallocates the service process C having been operating on the server device 32b to the server device 32c, and reallocates the service process D having been operating on the server device 32b to the server device 32a. In other words, in the example illustrated in FIG. 6, the reallocator 5 reallocates the service processes having been operating on the server device 32b equally to the other server devices 32. This method can maximize the performance, the availability, and the like of the service processes operating in the second cluster.

Figure 7:
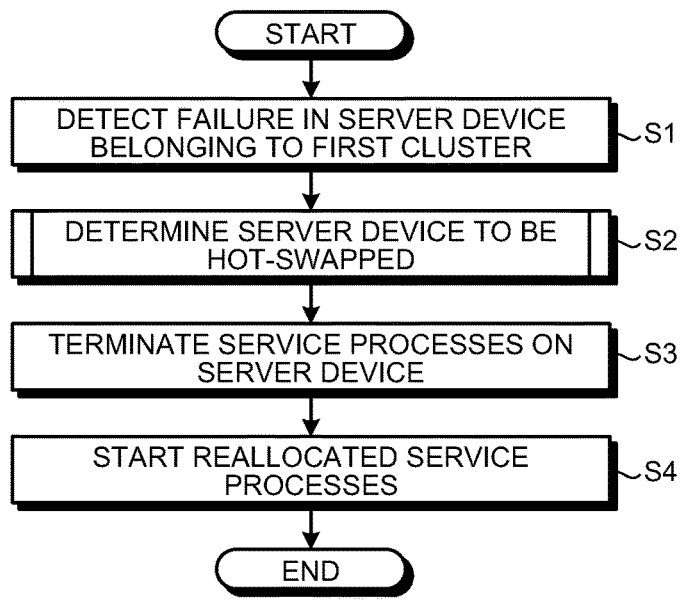
FIG. 7 is a flowchart for explaining an exemplary method in which the cloud system management apparatus according to the embodiment reallocates a service process belonging to the first cluster.
Figure 8:
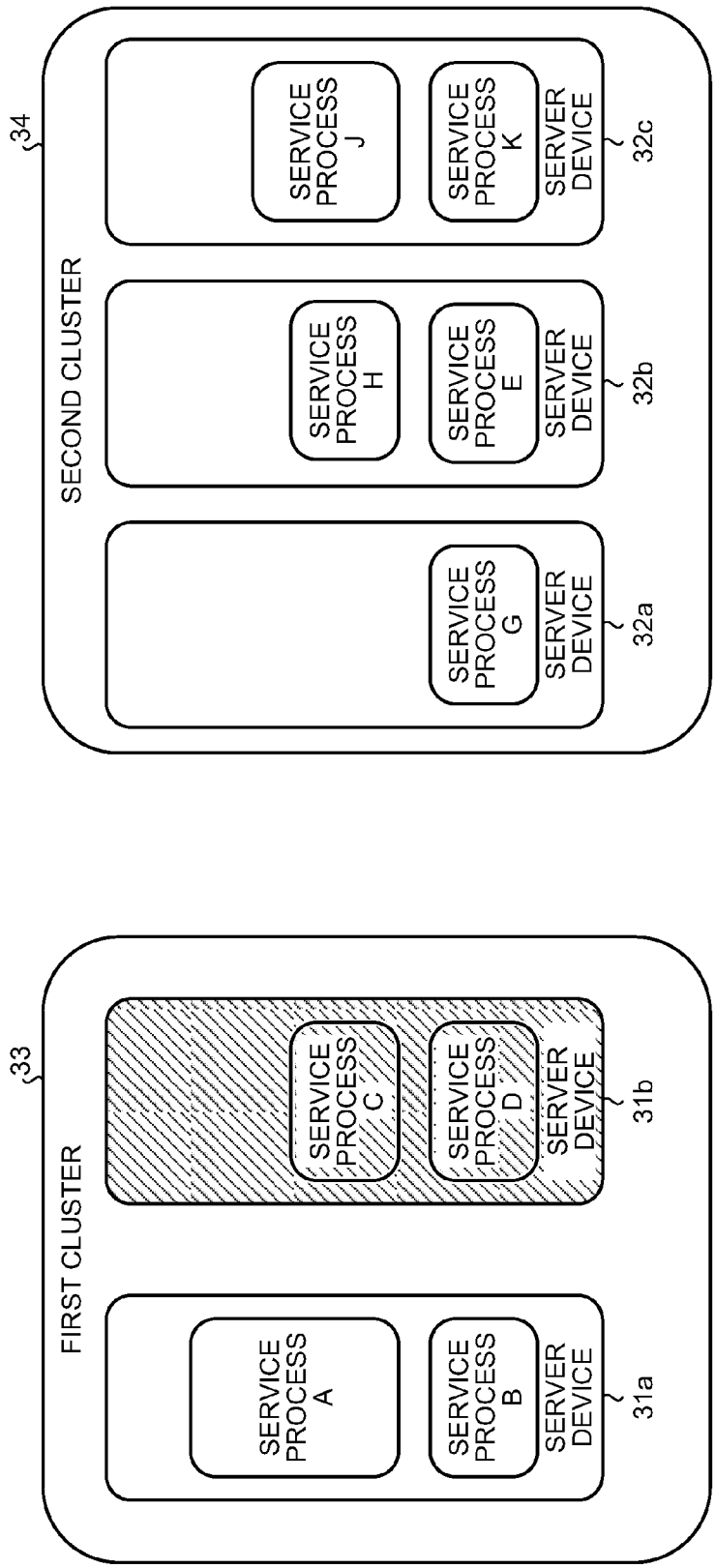
FIG. 8 is a schematic for explaining an exemplary method for reallocating a service process belonging to the first cluster in the cloud system according to the embodiment.
Figure 9:
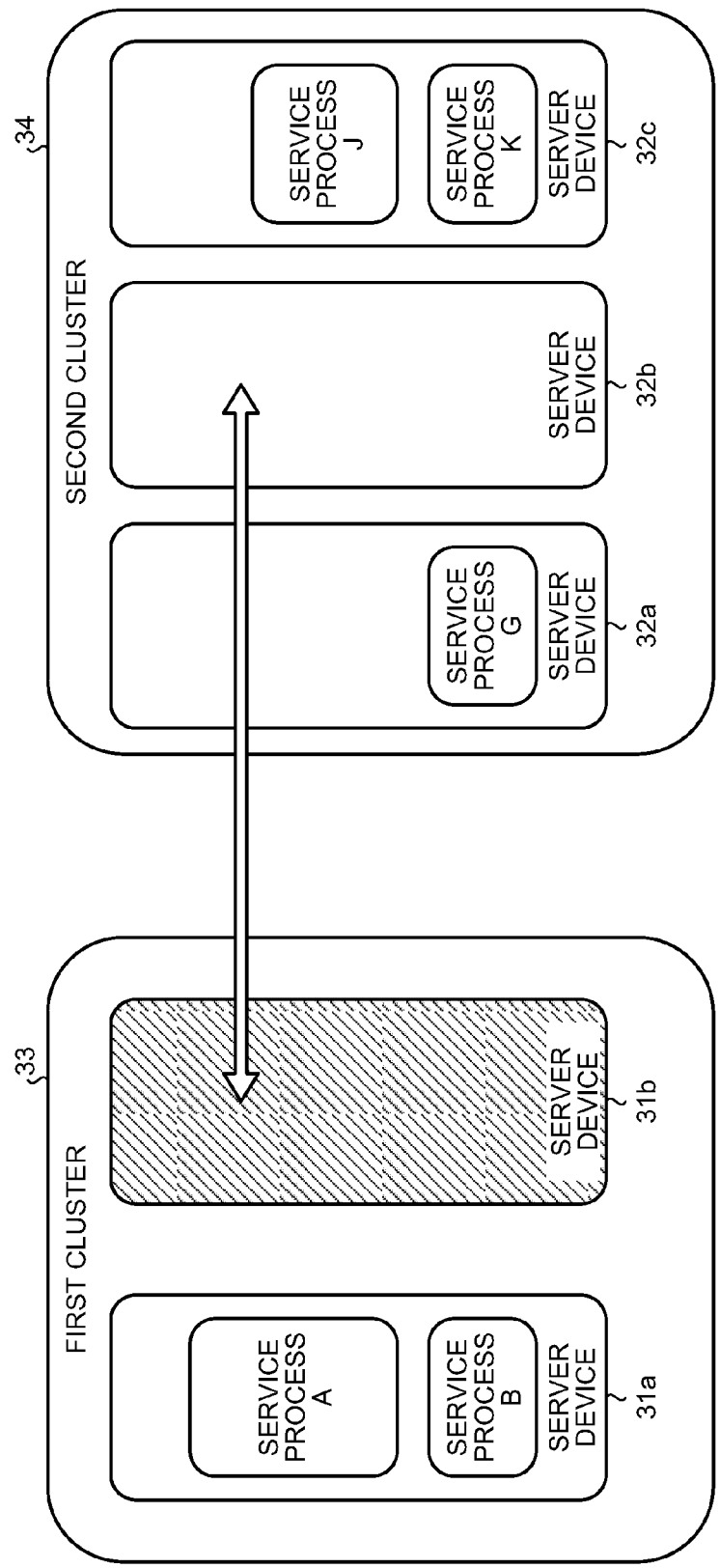
FIG. 9 is a schematic for explaining an exemplary method for reallocating a service process belonging to the first cluster in the cloud system according to the embodiment.
Figure 10:
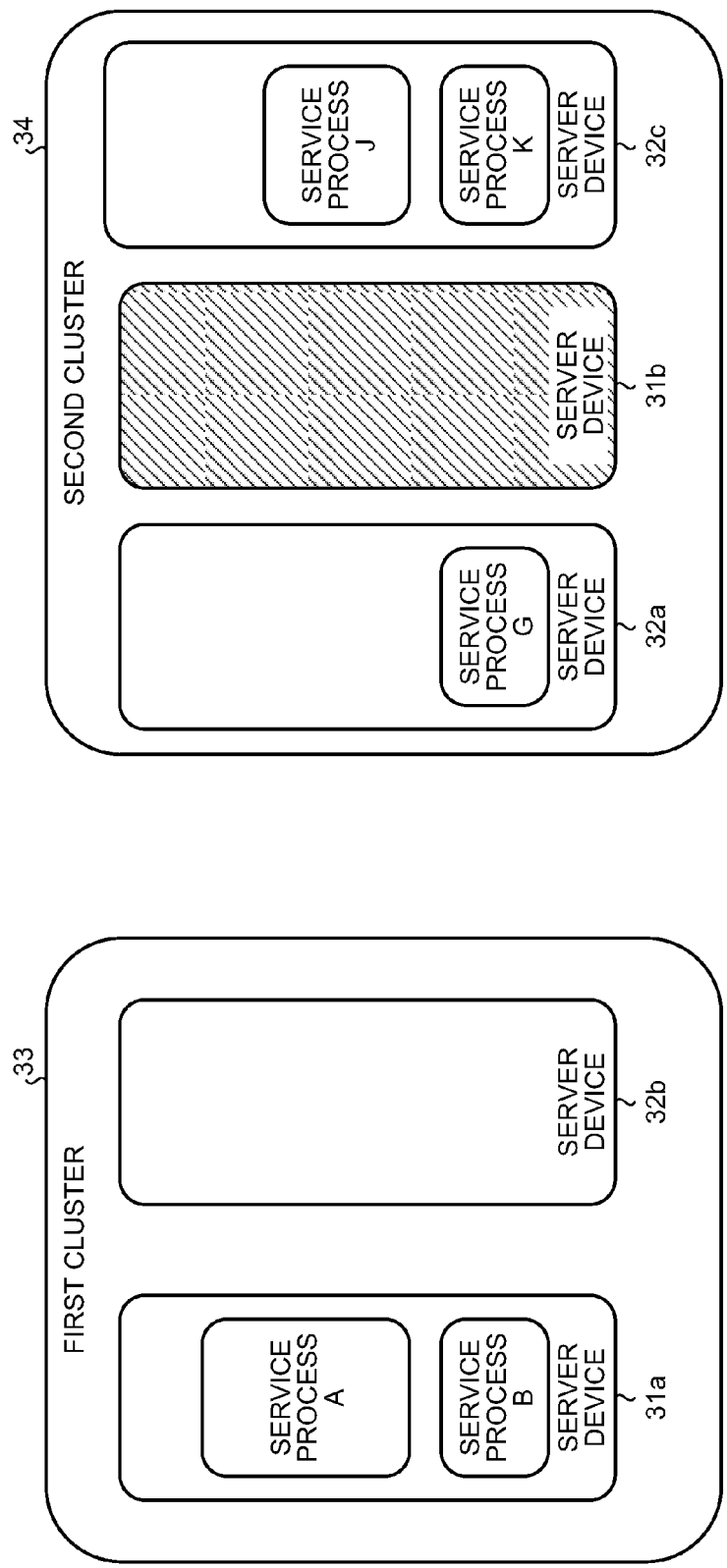
FIG. 10 is a schematic for explaining the exemplary method for reallocating a service process belonging to the first cluster in the cloud system according to the embodiment.

A method in which the cloud system management apparatus 10 according to the embodiment reallocates a service process belonging to the first cluster 33 will now be explained. FIG. 7 is a flowchart for explaining an example of the method in which the cloud system management apparatus 10 according to the embodiment reallocates a service process belonging to the first cluster 33. FIGS. 8 to 10 are schematics for explaining example of the method in which the cloud system 100 according to the embodiment reallocates a service process belonging to the first cluster 33.

To begin with, the detector 1 detects a failure in a server device 31 belonging to the first cluster 33 (Step S1). This process will now be explained using the example illustrated in FIG. 8. In the example illustrated in FIG. 8, the first cluster 33 includes the server device 31a and the server device 31b, and the second cluster 34 includes the server device 32a, the server device 32b, and the server device 32c.

In the example illustrated in FIG. 8, a service process A and a service process B are operating on the server device 31a, and the server device 31b is represented as failed. The detector 1 detects a failure in the server device 31b on which a service process C and a service process D have been operating. On the server device 32a, a service process G is operating. On the server device 32b, a service process H and a service process E are operating. On the server device 32c, a service process J and a service process K are operating.

Referring back to FIG. 7, the determination processor 4 determines a target server device 32 (target server device 32) to be hot-swapped with the server device 31 having been detected as failed (Step S2). This process will now be explained using the example illustrated in FIG. 9. In the example illustrated in FIG. 9, the determination processor 4 determines the server device 32b as the server device 32 to which the service processes having been operating on the server device 31b are to be reallocated. The way in which the determination processor 4 determines the target server device 32 (Step S2) will be described later in detail.

After the hot-swapping, the cloud system 100 recognizes the hot-swapped server device 31 in the first cluster 33 as a server device 32 in the second cluster 34. After the hot-swapping, the cloud system 100 also recognizes the hot-swapped server device 32 in the second cluster 34 as a server device 31 in the first cluster 33. FIG. 10 represents that the cloud system 100 uses the hot-swapped target server device 32b as a part of the first cluster, and the cloud system 100 recognizes the failed server device 31b as belonging to the second cluster. If recovery of the failed server device 31b is possible, for reasons such as the failure being a minor problem, the recovered server device 31b is used in the second cluster.

Referring back to FIG. 7, the reallocator 5 terminates the service processes (second service processes) on the target server device 32 (Step S3), and then starts the reallocated service processes (the first service processes and the second service processes) (Step S4). This process will now be explained using the example illustrated in FIG. 11. In the example illustrated in FIG. 11, the reallocator 5 reallocates the first service processes (the service process C and the service process D) requiring reallocation to the server device 32b determined by the determination processor 4. The reallocator 5 also reallocates the second service process (service process H) having been operating on the server device 32b, which has been determined to be the target server device, to the server device 32a. The reallocator 5 also reallocates the second service process (service process E) having been operating on the server device 32b, which has been determined to be the target server device, to the server device 32c.

Figure 11:
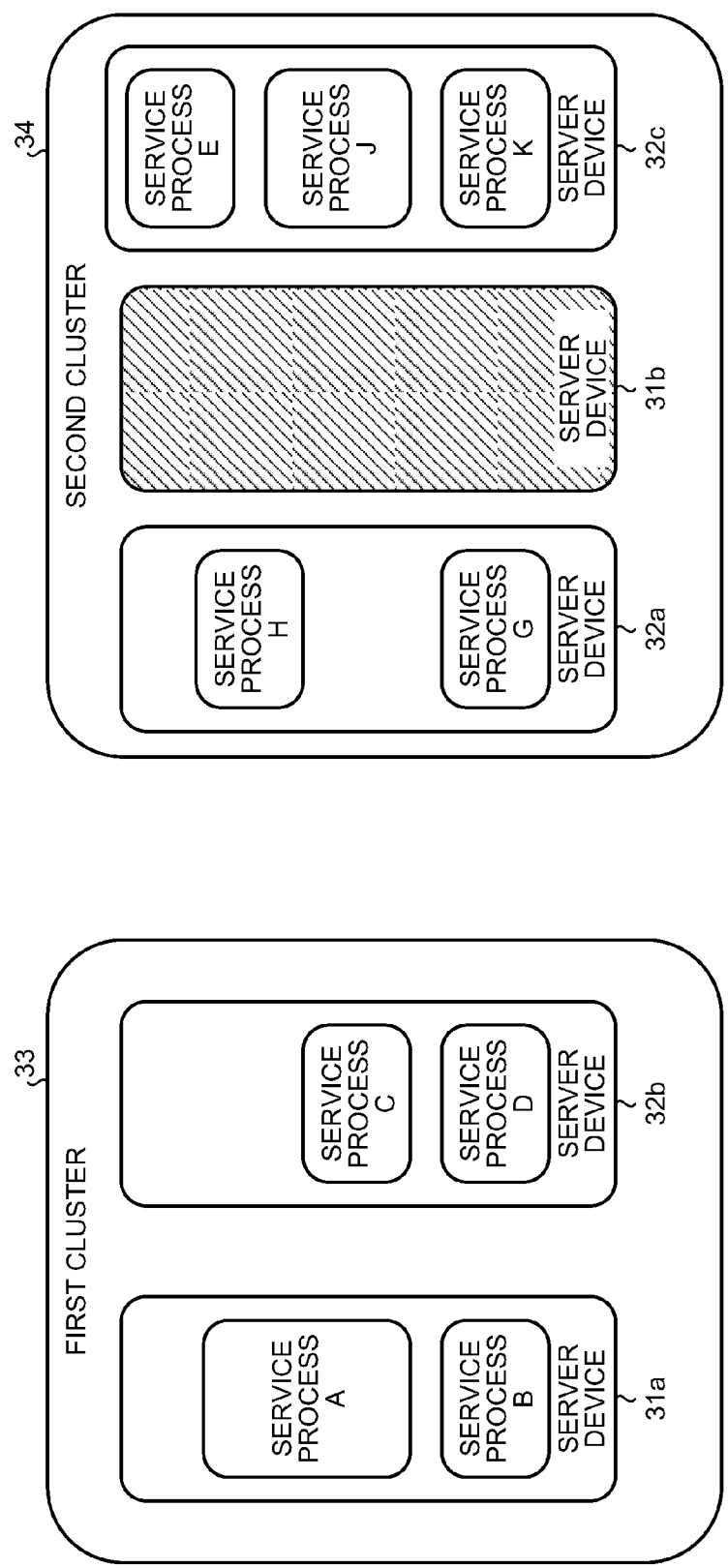
FIG. 11 is a schematic for explaining the exemplary method for reallocating a service process belonging to the first cluster in the cloud system according to the embodiment.

In the example illustrated in FIG. 11, the server device 31b having been running the first service processes (the service process C and the service process D), now requiring reallocation, is hot-swapped with the server device 32b having been used in the second cluster. In this manner, the cloud system management apparatus 10 can reallocate the first service processes while maintaining the quality (the availability, the performance, and the like) of the first service processes belonging to the first cluster.

According to the embodiment, the cloud system 100 includes the first cluster including the server devices 31 and the second cluster including the server devices 32, and the server devices 31 run the first service processes with a requirement to guarantee the quality level specified in the quality information, and the server devices 32 run the second service processes not always required to guarantee the quality level specified in the quality information. Alternatively, the cloud system 100 may also use only one cluster, without distinguishing the clusters. When there is only one cluster, the cloud system management apparatus 10 may reallocate the service processes merely by determining which one of the server device 31 (32) should be used as the target server device based on the quality information of the service processes running on the server device 31 (32), without giving any consideration to the cluster type.

Oppositely, the cloud system 100 may classify the clusters into sub-groups. The second cluster 34 in which the second service processes operate may be classified into the second cluster 34 and a third cluster, for example, based on the quality information representing the quality requirements imposed on the service processes. In other words, the cloud system management apparatus 10 may have a function for determining the quality requirement imposed on a service process, using thresholds or the like. The cloud system management apparatus 10 may then allocate a service process assigned with a threshold equal to or higher than a predetermined level to a server device 32 in the second cluster 34, and allocate another service process assigned with a threshold lower than the predetermined level to a server device in the third cluster. This determining function may be provided to the estimator 3, for example. It is also possible for the cloud system management apparatus 10 to set a higher upper boundary to the resource overcommitment ratio (a ratio of logical resources having been already assigned with respect to the physical resources) to the third cluster than that set to the second cluster. The cloud system management apparatus 10 may also charge a higher price for the use of the second cluster than that for the third cluster. The determination processor 4 may then determine which one of the clusters is used for hot-swapping, by comparing which one of the second and the third clusters are near the respective upper boundaries of the overcommitment ratios.

It is also possible for the reallocator 5 not to move the service process operating on the server device 31 (32) to another server device 31 (32). An example of such a case is when the quality information specifies a processing time for a service process. In such a case, the breach information is determined based on the processing time. When the target server device 31 (32) has some extra resources, the breach information will not be generated even when another service process is added to the target server device 31 (32). In such a case, the reallocator 5 does not need to move the service process having been operating on the target server device 31 (32) to another server device 31 (32).

Figure 12:
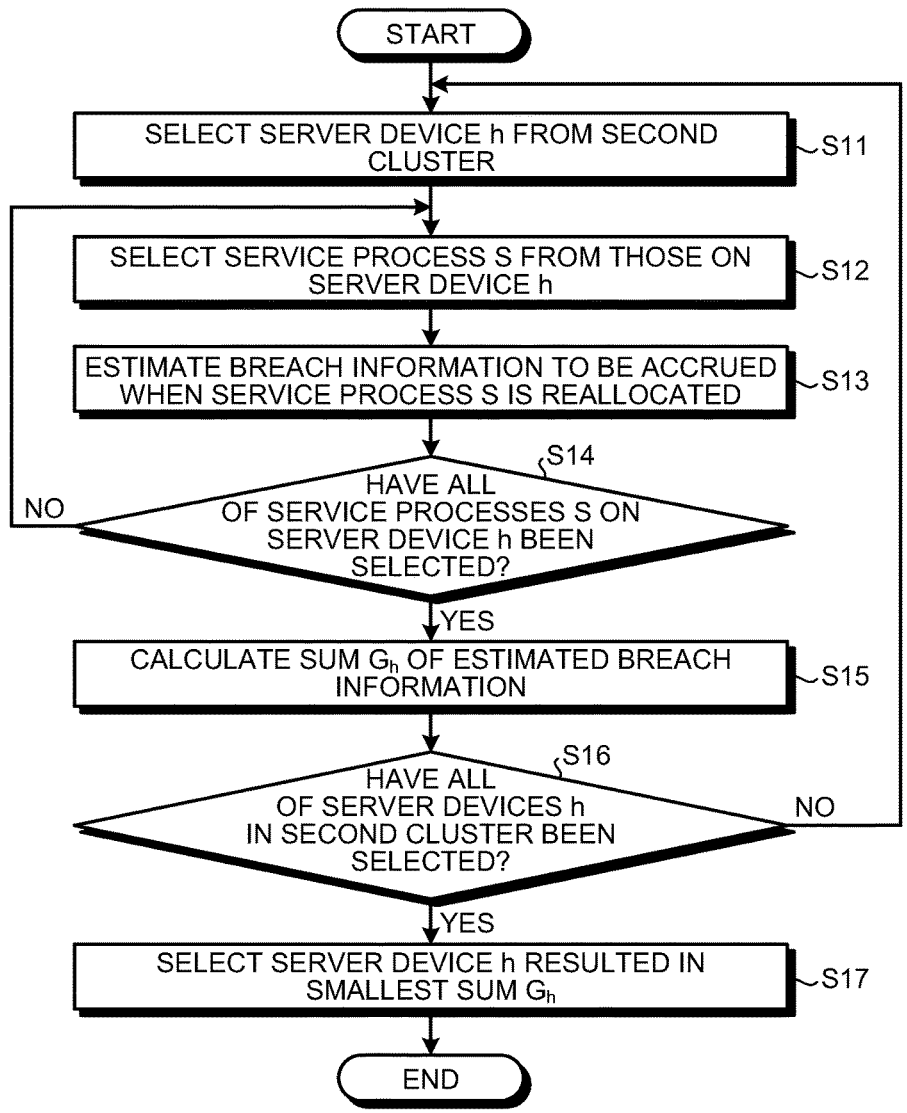
FIG. 12 is a flowchart for explaining an exemplary method in which the cloud system management apparatus according to the embodiment determines the server device to which a service process belonging to the first cluster is to be reallocated.

FIG. 12 is a flowchart for explaining an example of the method in which the cloud system management apparatus 10 according to the embodiment determines the server device 32 to which a service process belonging to the first cluster 33 is to be reallocated.

The estimator 3 selects a server device h from a group of server devices 32 belonging to the second cluster 34 (Step S11). The estimator 3 then selects a service process S from those running on the server device h (Step S12), and estimates the breach information to be accrued when the service process S is reallocated (Step S13). The estimator 3 then determines whether all of the service processes S on the server device h have been selected (Step S14). If all of the service processes S on the server device h have been selected, the estimator 3 calculates the sum $G_h$ of the estimated breach information (Step S15). If all of the service processes S on the server device h have not been selected yet, the process is returned to Step S12. The estimator 3 then determines whether all of the server devices 32 in the second cluster 34 have been selected (Step S16). If all of the server devices 32 in the second cluster 34 have been selected, the determination processor 4 then selects a server device h resulted in the smallest sum $G_h$ (Step S17). At Step S17, the determination processor 4 may not necessarily select the server device h resulted in the smallest sum $G_h$. For example, the determination processor 4 may only prioritize the server device h resulted in the smallest sum $G_h$, taking other indices into consideration. If all of the server devices 32 in the second cluster 34 have not been selected yet, the process is returned to Step S11.

An exemplary method for estimating the breach information will now be explained. An estimation of the breach information, which is calculated for each of the service processes, can be calculated based on the quality information (e.g., SLA) and the sum of a downtime during the past 1 year and an expected processing time to be required in reallocation. The expected processing time to be required in reallocation is estimated as an average of the reallocation time actually required in the past. Specifically, this average processing time required in the reallocations in the past can be calculated as a quotient of the downtime of the corresponding process stored in the storage 2 divided by the number of reallocations carried out in the past. When the service process has not been reallocated in the past, there is no past data related to a reallocation. In such a case, results of preliminary evaluations or the like, or actual past data acquired from other services similar to the service process to be reallocated may be used instead.

When a plurality of server devices 32 have the smallest breach information estimation with another reallocation taken into consideration (hot-swapping target server devices 32) (e.g., when a plurality of server devices equally have breach information of zero), the estimator 3 estimates the expected breach information again, in order to select the most optimal one of the server devices 32, under an assumption that the target server device 32 then fails after the reallocation. By selecting the server device 32 in the manner described above, it is possible to select a server device 32 not only resulting in the smallest breach information after the reallocation, but also resulting in the smallest expected breach information even after another server device 32 fails subsequently to the reallocation.

Explained now is an exemplary method for estimating the expected breach information when there are a plurality of server devices 32 with the smallest breach information (candidates of the target server device 32).

Let us assume herein that the total number of the server devices 32 belonging to the second cluster 34 is N, and each of the server devices 32 is numbered from 1 to N. Calculated in this example is the expected breach information to be accrued with an assumption that each of the server devices $h_k$ (1≤k≤N) is selected as the target server device 32, and a server device 32 in the second cluster 34 then fails.

In the explanation below, it is also assumed that the probability of each of the server devices $h_k$ (1≤k≤N) failing is equal. It is also assumed that, considering that the probability of each one of the server devices $h_k$ (1≤k≤N) failing is sufficiently low, the expected breach information resulting from the simultaneous failures of a plurality of server devices $h_k$ is zero. In other words, because the probability of a two-point failure is quite low, the expected breach information resulting from a single-point failure occupies a dominant part of the expected breach information. The determination processor 4 therefore selects the server device $h_k$ a single-point failure of which is expected to take up the smallest portion of the dominant part, as the target server device to which a service process is to be reallocated.

To begin with, symbols used in the explanation will be explained. Here, "s" denotes the service processes operating on a server device 32 in the second cluster 34; g(n, s) denotes the estimation of the breach information when the service processes s are reallocated "n" times from an estimation reference time point. Specifically, the breach time is estimated by, for example, subtracting the quality information (e.g., 52 minutes) from the sum of the processing time expected to be required in "n" reallocations and the downtime having occurred in the past 1 year. Breach information corresponding to this breach time (e.g., a penalty) is then calculated, and this breach information is set as g(n, s). Here, g(0, s) represents the breach information on the service processes s at the estimation reference point.

An increase G(n, s) in the breach information resulting from "n" reallocations is defined by Equation (1) below.

$$G(n,s)=g(n,s)-g(n-1,s) \quad (1)$$

To simplify the calculation, it is assumed herein that all of the server devices $h_k$ are the same device. In other words, it is assumed herein that G(n, s) can be estimated regardless of which one of the server devices $h_k$ the service processes are allocated to.

When the service processes s on the server device $h_k$ are moved to another server device 32 once (after the service processes s are reallocated once), the resultant breach information on all of the service processes s can be expressed as Expression (2) below.

$$\sum_{s \in H_k} g(1,s) + \sum_{NOT s \in H_K} g(0,s) \quad (2)$$

Where $H_k$ denotes a group of service processes having been operating on the server device $h_k$. The first term in Expression (2) represents the sum of breach information on all of the service processes s having been operating on the server device $h_k$. The second term in Expression (2) represents the sum of breach information on all of the service processes s having been operating on the server devices 32 other than the server device $h_k$. Expression (2) can be transformed to Equation (3) in the manner described below.

$$\sum_{s \in H_k} g(1,s) + \sum_{NOT s \in H_k} g(0,s) = \sum_{s \in H_k} g(1,s) + \quad (3)$$

$$\left( \sum_{ALL\ s} g(0,s) - \sum_{s \in H_k} g(0,s) \right)$$

$$= \sum_{ALL\ s} g(0,s) + \sum_{s \in H_k} (g(1,s) - g(0,s))$$

$$= \sum_{ALL\ s} g(0,s) + \sum_{s \in H_k} G(1,s)$$

In other words, after the service processes s having been running on the server device $h_k$ are reallocated to another server device 32, breach information accrued for the service processes s across the entire server devices 32 is the sum of the breach information at the estimation reference time (first term) and an increase in the breach information resulting from the one reallocation of the service processes s from the server device $h_k$ (second term). It can be seen that the term dependent on k is only the second term in Equation (3).

When there are a plurality of server devices 32 resulting in the smallest breach information estimation after one reallocation (e.g., when a plurality of server devices equally have breach information of zero), it can be said that there are a plurality of server devices $h_k$ for which the second term in Equation (3) is the smallest (the same). Therefore, when expected breach information estimation is calculated again, it can be assumed that the results of following Expression (4) are also the same.

$$\sum_{s \in H_k} G(1,s) \quad (4)$$

The estimator 3 then calculates, for each of the server devices $h_k$ (1≤k≤N), the expected breach information resulting from a failure of a server device 32 in the second cluster 34 after each of the server devices $h_k$ is selected as the target server device 32. This expected breach information can be calculated from Expression (5) below. In Expression (5), an expected penalty increase for the service processes s accrued from a failure in one of the server devices $h_i$ (1≤i≤N) is added to Equation (1).

$$\sum_{ALL\ s} g(0,s) + \sum_{s \in H_k} G(1,s) + \sum_{1 \le i \le N} p \sum_{s \in H_i} \overline{G}(s) \quad (5)$$

Where, "p" denotes the probability of the server device $h_i$ failing (it is assumed herein that the probability of each of the server devices $h_i$ failing is equal); $\overline{H}_i$ denotes a group of service processes having been operating on the server device $h_i$ after the first reallocation (after the first hot-swapping); and $\overline{G}(s)$ denotes an increase in the breach information on the services s.

$\overline{G}(s)$ can be expressed as Equation (6) below.

$$\overline{G}(s) = \begin{cases} G(2,s) & \text{if } s \in H_k \\ G(1,s), & \text{otherwise} \end{cases} \quad (6)$$

Expression (5) can be transformed into Equation (7) in the manner described below.

$$\sum_{1 \le i \le N} P \sum_{s \in H_i} \overline{G}(s) = p \sum_{1 \le i \le N} \sum_{s \in H_i} \overline{G}(s) \qquad (7)$$

$$= p \sum_{ALL\ s} \overline{G}(s)$$

$$= p \left( \sum_{s \in H_k} G(2, s) + \sum_{NOT\ s \in H_k} G(1, s) \right)$$

$$= p \left( \sum_{s \in H_k} G(2, s) + \sum_{ALL\ s} G(1, s) - \sum_{s \in H_k} G(1, s) \right)$$

Because the third term of Equation (7) (Expression (4)) remains the same among the server devices $h_k$ for which the expected breach information is being evaluated, a term dependent on k is only the first term in Equation (7). In other words, the determination processor 4 can determine the server device $h_k$ for which the value calculated from Expression (8) below is the smallest.

$$\sum_{s \in H_k} G(2, s) \qquad (8)$$

Because Expression (8) can output a determinate value regardless of the failure probability "p" and the target server devices 32 to which the service processes s are reallocated, Expression (8) can be actually calculated. Based on the calculation above, even when the server device $h_k$ fails twice or more (when two or more server device $h_k$ fail) after one reallocation, Expression (9) below can be used in evaluating the estimations of the expected breach information.

$$\sum_{s \in H_k} G(n, s) \qquad (9)$$

In other words, when there are a plurality of server devices 32 for which Expression (8) results in the same value (e.g., a plurality of server devices equally results in zero), the expected breach information is evaluated again assuming that the service processes s having been operating on the server device $h_k$ (1≤k≤N) at the estimation reference time are reallocated again, by setting n=3 in Expression (9). In the manner described above, the estimator 3 estimates the expected breach information by evaluating Expression (9) by incrementing the value "n". The determination processor 4 then determines the server device $h_k$ to be hot-swapped based on the expected breach information.

With the cloud system management apparatus 10 according to the embodiment, when a server device 31 (32) in the cloud system 100 fails, the estimator 3, the determination processor 4, and the reallocator 5 can efficiently allocate available server devices 31 (32) to the service processes, based on the quality levels to be achieved by the respective service processes.

Furthermore, with the cloud system management apparatus 10 according to the embodiment, service processes with quality information (e.g., the SLA) requiring different-quality levels can be managed efficiently in the cloud system 100.

Other Embodiments

A cloud system management apparatus 10 and a cloud system 100 according to other embodiments will now be explained. In the cloud system 100 according to the embodiment described above, the server devices 31 (32) are all used. As another exemplary cloud system 100 according to the embodiment, an example in which a backup server device is provided as an extra resource will now be explained.

The backup server device is used as a server device in the second cluster 34. The quality level to be achieved by a service process operating on the backup server device (hereinafter, referred to as "backup service process") is lower than those operating on the server devices 32 in the second cluster 34. For example, the backup service process is a service process that can be terminated immediately when a server device 31 (32) fails. The backup service process therefore does not need to be reallocated to another server device 31 (32) or another backup server device even when the determination processor 4 determines a backup server device 31 as the target server device to be hot-swapped. When a server device 31 in the first cluster fails, the determination processor 4 first determines the backup server device as the target server device to be hot-swapped.

With the cloud system management apparatus 10 and the cloud system 100 according to the embodiment, the resources of the cloud system 100 can be allocated efficiently based on the quality levels to be achieved by service processes even when there is some allowance in the resources of the cloud system 100.

Figure 13:
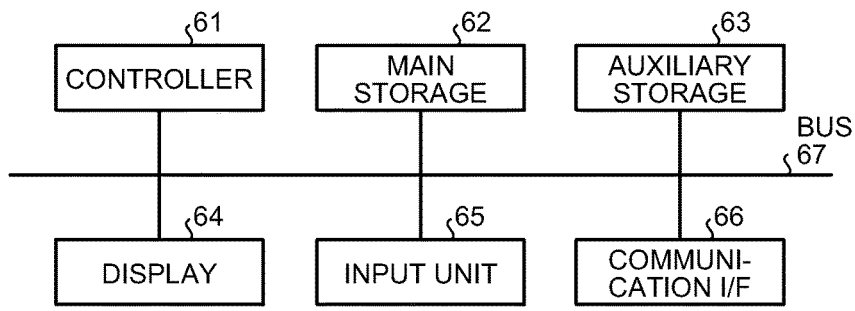
FIG. 13 is a schematic illustrating an exemplary hardware configuration of the cloud system management apparatus and the server device in the cloud system according to the embodiment.

An exemplary hardware configuration of the cloud system management apparatus 10 and the server device 31 (32) in the cloud system 100 according to the embodiments will now be explained. FIG. 13 is a schematic illustrating an exemplary hardware configuration of the cloud system management apparatus and the server device in the cloud system according to the embodiment. In the explanation below, the cloud system management apparatus 10 is used as an example.

The cloud system management apparatus 10 according to the embodiment includes a controller 61, a main storage 62, an auxiliary storage 63, a display 64, an input unit 65, and a communication interface (I/F) unit 66. The controller 61, the main storage 62, the auxiliary storage 63, the display 64, the input unit 65, and the communication I/F unit 66 are all connected to one another via a bus 67.

The controller 61 executes a computer program read from the auxiliary storage 63 onto the main storage 62. The main storage 62 is a memory such as a read-only memory (ROM) or a random access memory (RAM). Examples of the auxiliary storage 63 include a hard disk drive (HDD) and an optical drive. The display 64 is a screen for displaying conditions of the cloud system management apparatus 10 and the like. An example of the display 64 includes a liquid crystal display. The input unit 65 is an interface for operating the cloud system management apparatus 10. Examples of the input unit 65 include a keyboard and a mouse. The communication I/F unit 66 is an interface for establishing a connection to a network.

A computer program executed by the cloud system management apparatus 10 according to the embodiments is provided as a computer program product stored in a computer-readable storage medium such as a compact disc read-only memory (CD-ROM), a flexible disk (FD), a compact disc recordable (CD-R), or a digital versatile disc (DVD), as a file in an installable or executable format.

Furthermore, the computer program executed by the cloud system management apparatus 10 according to the embodiments may be stored in a computer connected to a network such as the Internet, and provided by making available for download over the network. Furthermore, the computer program executed by the cloud system management apparatus 10 according to the embodiment may be provided or distributed over a network such as the Internet.

Furthermore, the computer program for the cloud system management apparatus 10 according to the embodiments may be provided in a manner incorporated in the ROM or the like in advance.

The computer program executed by the cloud system management apparatus 10 according to the embodiments has a modular structure including the functional blocks described above (the detector 1, the estimator 3, the determination processor 4, and the reallocator 5). As actual hardware, by causing the controller 61 to read the computer program from the auxiliary storage 63, for example, and to execute the computer program, these functional blocks are loaded onto the main storage 62. In other words, these functional blocks are generated on the main storage 62.

A part or the whole of these units (the detector 1, the estimator 3, the determination processor 4, and the reallocator 5) may be implemented as hardware such as an integrated circuit (IC) instead of software. The storage 2 is, for example, the auxiliary storage 63. The data in the storage 2 implemented as the auxiliary storage 63 may be loaded onto the main storage 62.

As explained above, with the cloud system management apparatus 10 according to the embodiment, when a server device 31 (32) in the cloud system 100 fails, the estimator 3, the determination processor 4, and the reallocator 5 can allocate the available server devices 31 (32) to the service processes efficiently, based on the quality levels to be achieved by the service processes.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A cloud system management apparatus comprising:
an estimator configured to estimate breach information based on quality information representing a quality level to be achieved by a service process operating in any one of server devices in a cloud system, the breach information representing a degree by which the service process is incapable of achieving the quality level;
a detector configured to detect a failure of each server device;
a determination processor configured to determine, to reallocate at least one first service process operating on a first server device whose failure is detected, a second server device having a smaller sum of the breach information on at least one second service process operating on the second server device; and
a reallocator configured to reallocate the first service process to the second server device.

2. The apparatus according to claim 1, wherein the reallocator is configured to reallocate the second service process to a third server device.

3. The apparatus according to claim 2, wherein the cloud system includes
a first cluster including server devices each for operating the first service process the quality information of which specifies that the quality level is always need to be satisfied, and
a second cluster including server devices each for operating the second service process the quality information of which specifies that the quality level is not always need to be satisfied, and
the determination processor is configured to, when a failure of a server device of the first cluster is detected, determine as the second server device a server device having a smaller sum of the breach information on the second service process operating on the server device among from the server devices of the second cluster.

4. The apparatus according to claim 2, wherein the cloud system includes a second cluster including server devices each for operating the second service process the quality information of which specifies that the quality level is not always need to be satisfied, and
the third server device is a server device of the second cluster.

5. The apparatus according to claim 1, wherein the estimator is configured to estimate the breach information by adding a downtime when the service process is reallocated to a cumulative downtime of the service process.

6. The apparatus according to claim 1, wherein the estimator is configured to estimate the breach information based on a processing time calculated from a ratio of resources of the second server device to be available to the first service process in a case where the first service process is reallocated to the second server device.

7. A cloud system comprising:
a plurality of server devices operating at least one service process; and
a cloud system management apparatus including
an estimator configured to estimate breach information based on quality information representing a quality level to be achieved by a service process operating in any one of the server devices, the breach information representing a degree by which the service process is incapable of achieving the quality level;
a detector configured to detect a failure of each server device;
a determination processor configured to determine, to reallocate at least one first service process operating on a first server device whose failure is detected, a second server device having a smaller sum of the breach information on at least one second service process operating on the second server device; and
a reallocator configured to reallocate the first service process to the second server device.

8. A reallocation method comprising:
stimating breach information based on quality information representing a quality level to be achieved by a service process operating in any one of server devices in a cloud system, the breach information representing a degree by which the service process is incapable of achieving the quality level;
detecting a failure of each server device;
determining, to reallocate at least one first service process operating on a first server device whose failure is detected, a second server device having a smaller sum of the breach information on at least one second service process operating on the second server device; and
reallocating the first service process to the second server device.

9. A computer program product comprising a non-transitory computer-readable medium containing a program executed by a computer, the program causing the computer to execute:
estimating breach information based on quality information representing a quality level to be achieved by a service process operating in any one of server devices in a cloud system, the breach information representing a degree by which the service process is incapable of achieving the quality level;

detecting a failure of each server device;

determining, to reallocate at least one first service process operating on a first server device whose failure is detected, a second server device having a smaller sum of the breach information on at least one second service process operating on the second server device; and reallocating the first service process to the second server device.

* * * * *